(12) United States Patent
Fujiura et al.

(10) Patent No.: US 11,867,227 B2
(45) Date of Patent: Jan. 9, 2024

(54) BEARING MONITORING APPARATUS AND METHOD FOR MONITORING BEARING

(71) Applicant: MINEBEA MITSUMI Inc., Nagano (JP)

(72) Inventors: Hideo Fujiura, Nagano (JP); Yukinori Hirai, Tokyo (JP); Shintaro Takata, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 249 days.

(21) Appl. No.: 17/596,755

(22) PCT Filed: Jun. 11, 2020

(86) PCT No.: PCT/JP2020/023073
§ 371 (c)(1),
(2) Date: Dec. 17, 2021

(87) PCT Pub. No.: WO2020/255860
PCT Pub. Date: Dec. 24, 2020

(65) Prior Publication Data
US 2022/0243771 A1 Aug. 4, 2022

(30) Foreign Application Priority Data

Jun. 21, 2019 (JP) .................................. 2019-115681

(51) Int. Cl.
*F16C 19/52* (2006.01)
*F16C 33/58* (2006.01)
*G01L 5/00* (2006.01)
*G01M 13/04* (2019.01)
(Continued)

(52) U.S. Cl.
CPC ............ *F16C 19/06* (2013.01); *F16C 19/522* (2013.01); *F16C 33/586* (2013.01);
(Continued)

(58) Field of Classification Search
CPC ...... F16C 19/06; F16C 19/522; F16C 19/527; F16C 33/586; F16C 35/073; F16C 35/077;
(Continued)

(56) References Cited

U.S. PATENT DOCUMENTS 9,011,013 B2    4/2015  Norimatsu et al.
2002/0062694 A1*  5/2002  Ehrfeld ................. G01L 5/0009
                                                                         73/593
(Continued)

FOREIGN PATENT DOCUMENTS

AU    2013251974 A1 * 10/2014 ............ F16C 19/522
DE       10041093           3/2002
(Continued)

OTHER PUBLICATIONS

Extended European Search Report dated Jun. 14, 2022 with respect to the corresponding European patent application No. 20825459.9.
(Continued)

*Primary Examiner* — Phillip A Johnson
(74) *Attorney, Agent, or Firm* — IPUSA, PLLC

(57) ABSTRACT

A bearing monitoring apparatus includes a rolling bearing, multiple rolling elements, a strain gauge configured to detect strain of the outer ring or the inner ring, the strain gauge including at least two resistors, and the resistors being arranged in a same direction as an arrangement direction of the rolling elements so as to correspond to spacing between rolling elements that are next to each other. The bearing monitoring apparatus includes a first circuit configured to generate a first distorted waveform based on an output of one resistor and to generate a second distorted waveform based on an output of another resistor. The bearing monitoring apparatus includes a second circuit configured to subtract the second distorted waveform from the first distorted waveform (Continued)

to generate a differential waveform. The second circuit is configured to compare the differential waveform against a reference value to detect a wear state of the rolling bearing.

9 Claims, 15 Drawing Sheets

(51) Int. Cl.
    *F16C 19/06*     (2006.01)
    *F16C 35/073*     (2006.01)
    *F16C 35/077*     (2006.01)
    *G01M 13/045*     (2019.01)

(52) U.S. Cl.
    CPC .......... *F16C 35/073* (2013.01); *F16C 35/077* (2013.01); *G01L 5/0019* (2013.01); *G01M 13/045* (2013.01); *F16C 2233/00* (2013.01)

(58) Field of Classification Search
    CPC .. F16C 2233/00; G01L 5/0019; G01M 13/04; G01M 13/045
    See application file for complete search history.

(56) References Cited

U.S. PATENT DOCUMENTS

| | | | |
|---|---|---|---|
| 2003/0066352 A1 | 4/2003 | Leamy et al. | |
| 2006/0218935 A1* | 10/2006 | Singh | F01D 25/162 |
| | | | 60/803 |
| 2006/0257060 A1 | 11/2006 | Gempper et al. | |
| 2008/0317396 A1 | 12/2008 | Pecher et al. | |
| 2011/0100132 A1* | 5/2011 | Schneider | F16C 19/522 |
| | | | 73/768 |
| 2019/0204182 A1 | 7/2019 | Yamashita et al. | |

FOREIGN PATENT DOCUMENTS

| | | | | |
|---|---|---|---|---|
| DE | 102017112342 A1 | * | 12/2018 | |
| EP | 2623949 A1 | * | 8/2013 | .......... G01M 13/028 |
| EP | 3276190 A1 | * | 1/2018 | .............. F16C 11/06 |
| FR | 2708044 A1 | * | 1/1995 | .......... F01D 25/164 |
| FR | 2913769 A1 | * | 9/2008 | .......... G01M 13/045 |
| GB | 2113845 A | * | 8/1983 | .............. G01L 5/12 |
| JP | 2003-161112 | | 6/2003 | |
| JP | 2008-164448 | | 7/2008 | |
| JP | 4535290 | | 9/2010 | |
| JP | 4736101 | | 7/2011 | |
| JP | 2017-026445 | | 2/2017 | |
| JP | 2017-219469 | | 12/2017 | |
| JP | 2019-070570 | | 5/2019 | |
| JP | 6508017 | | 5/2019 | |
| WO | 2017/203868 | | 11/2017 | |

OTHER PUBLICATIONS

International Search Report for PCT/JP2020/023073 dated Aug. 25, 2020.

* cited by examiner

BEARING MONITORING APPARATUS AND METHOD FOR MONITORING BEARING

TECHNICAL FIELD

The present invention relates to a bearing monitoring apparatus and a method for monitoring a bearing.

BACKGROUND

Rolling bearings are known to include an outer ring having a race on an inner peripheral side of the outer ring, an inner ring having a race on an outer peripheral side of the inner ring, rolling elements interposed between the race of the outer ring and the race of the inner ring, and a strain gauge that can be attached to a surface of the outer ring or the inner ring. The rolling bearings may be damaged due to abrasion, lubricant shortages, or the like, and thus it is important for an apparatus to monitor operation states of the rolling bearings.

For example, a vibration sensor for monitoring a bearing is used as a bearing monitoring apparatus, which is provided near a rolling bearing and at a location away from a bearing. In such a bearing monitoring apparatus, the vibration sensor obtains wideband signals having frequencies including a bearing defect peak of a monitored bearing. The wideband signals are analyzed in order to distinguish the presence of the bearing defect peak. If the bearing defect peak exists, an amplitude of the bearing defect peak is quantified in order to determine whether degradation of the monitored bearing has reached a predetermined threshold criterion (see, for example, Patent Document 1).

CITATION LIST

[Patent Document]
[Patent Document 1] Japanese Patent No. 4181842

SUMMARY

However, a bearing monitoring apparatus that can detect a wear state of a rolling bearing has not been provided.

In view of the point described above, an object of the present invention is to provide a rolling bearing that can detect a wear state of a rolling bearing.

A bearing monitoring apparatus includes a rolling bearing. The rolling bearing includes an outer ring and an inner ring disposed coaxially with the outer ring, the inner ring being on an inner peripheral side of the outer ring. The rolling bearing includes multiple rolling elements disposed between the outer ring and the inner ring. The rolling bearing includes a strain gauge configured to detect strain of the outer ring or the inner ring, the strain gauge including at least two resistors, and the resistors being arranged in a same direction as an arrangement direction of the rolling elements so as to correspond to spacing between rolling elements that are next to each other. The bearing monitoring apparatus includes a waveform generator configured to generate a first distorted waveform based on an output of one resistor and to generate a second distorted waveform based on an output of another resistor. The bearing monitoring apparatus includes a subtracting unit configured to subtract the second distorted waveform from the first distorted waveform to generate a differential waveform. The bearing monitoring apparatus includes a comparator configured to compare the differential waveform against a reference value to detect a wear state of the rolling bearing.

EFFECTS OF THE INVENTION

According to the disclosed techniques, a bearing monitoring apparatus that can detect a wear state of a rolling bearing can be provided.

DESCRIPTION OF EMBODIMENTS

Figure 1:
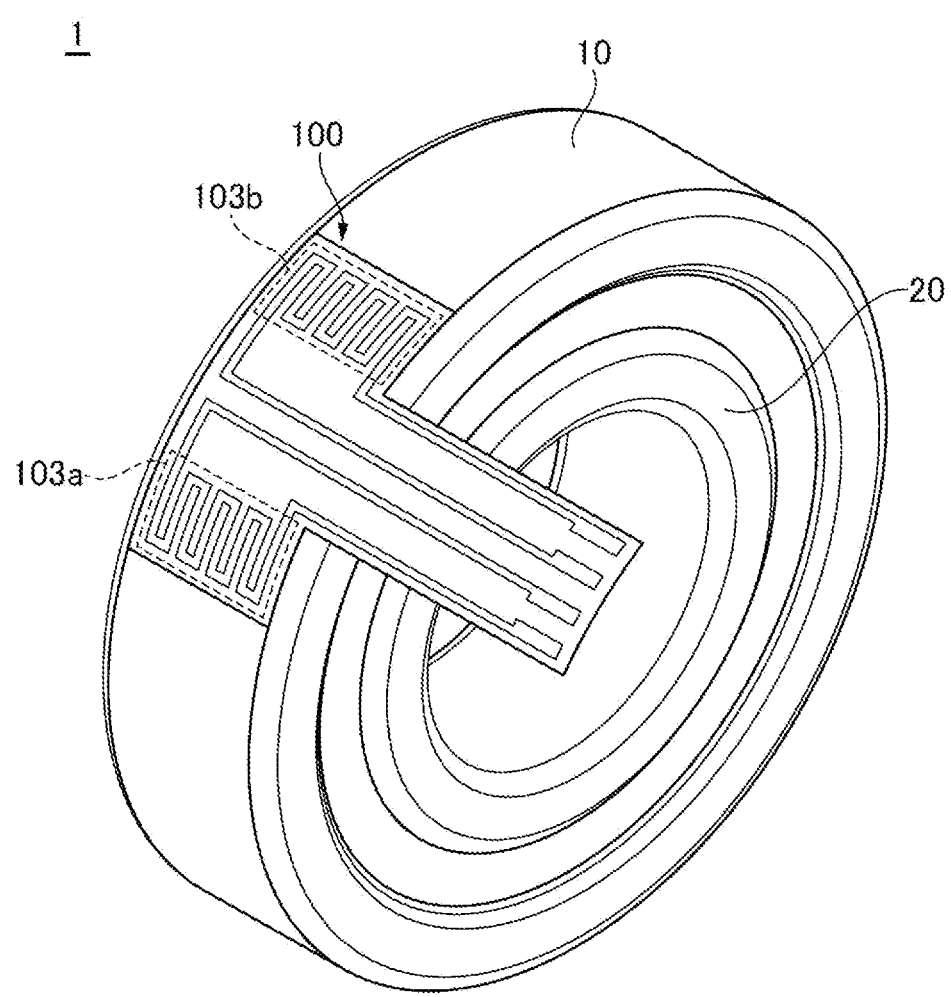
FIG. 1 is a perspective view of an example of a rolling bearing according to a first embodiment.

Hereinafter, one or more embodiments for carrying out the invention will be described with reference to the drawings. In each drawing, the same components are indicated by the same reference numerals and duplicate description thereof may be omitted.

<First Embodiment>
[Rolling Bearing]

Figure 2:
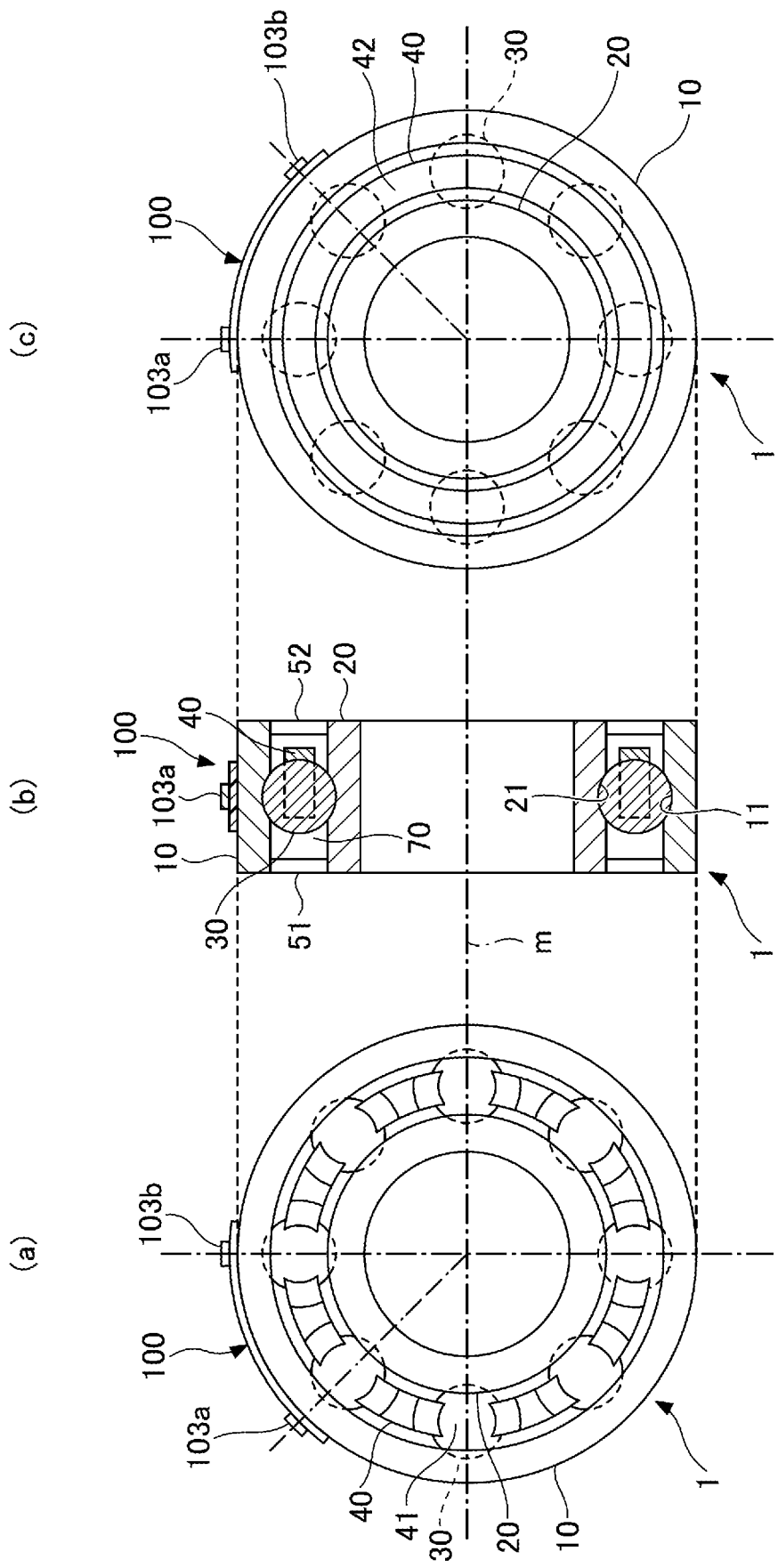
FIG. 2 is a diagram illustrating an example of the rolling bearing according to the first embodiment.

FIG. 1 is a perspective view of an example of a rolling bearing according to a first embodiment. FIG. 2 is a diagram illustrating an example of the rolling bearing according to the first embodiment. (a) of FIG. 2 is a front view of the rolling bearing, (b) of FIG. 2 is a cross-sectional view of the rolling bearing, and (c) of FIG. 2 is a back view of the rolling bearing.

Referring to FIG. 1 and FIG. 2, a rolling bearing 1 includes an outer ring 10, an inner ring 20, multiple rolling elements 30, a holder 40, seals 51 and 52, and a strain gauge 100. In (a) of FIG. 2 and (c) of FIG. 2, illustration of the seals 51 and 52 are omitted for the sake of convenience.

The outer ring 10 has a cylindrical structure of which a central axis is a rotation axis m. The inner ring 20 has a cylindrical structure that is disposed coaxially with the outer ring 10 and that is provided on an inner peripheral side of the outer ring 10. Each of the rolling elements 30 is a sphere disposed in a race 70 formed between the outer ring 10 and the inner ring 20. A lubricant (not illustrated) such as grease is applied to the race 70. The seals 51 and 52 protrude from the inner peripheral surface of the outer ring 10 toward the inner ring 20 to isolate the race 70 from the outside.

On the inner peripheral surface of the outer ring 10, a recessed portion 11 of which a cross-sectional shape is an arc shape is formed in a circumferential direction of the outer ring 10. A recessed portion 21 of which a cross-sectional shape is an arc shape is formed in a circumferential direction of the inner ring 20 and on an outer peripheral surface of the inner ring 20. The rolling elements 30 are guided in the circumferential direction by the recessed portions 11 and 21.

The holder 40 is disposed in the race 70 to hold the rolling elements 30. Specifically, the holder 40 is an annular element disposed coaxially with the rotation axis m. One side of the holder 40 in a direction of the rotation axis m includes recessed portions 41 for accommodating the respective rolling elements 30, and the other side of the holder 40 includes a back surface 42 continuously provided in a circumferential direction of the annular element.

A strain gauge 100 is a sensor that detects strain of the outer ring 10 or the inner ring 20, and includes sensitive portions that are a resistor 103a and a resistor 103b. In the present embodiment, the strain gauge 100 is attached to the outer peripheral surface of the outer ring 10, and detects strain of the outer ring 10 as changes in resistance values of the resistor 103a and the resistor 103b.

The resistor 103a and the resistor 103b are arranged in the same direction as an arrangement direction of the rolling elements 30, so as to correspond to spacing of rolling elements 30 that are next to each other.

In this description, when the resistors are arranged so as to correspond to spacing of rolling elements that are next to each other, it means that, when a predetermined resistor-placement region intersects a given one straight line, a resistor-placement region next to the predetermined resistor-placement region is at a location intersecting a given straight line next to the given one straight line, where a rolling bearing including the resistors is not in operation under a condition in which straight lines passing the centers of the respective rolling elements are radially drawn from the rotation axis m of the rolling bearing when the rolling bearing is viewed in a front direction. In this description, the resistor-placement region corresponds to a range defined under a condition of a gauge length×a gauge width. From the viewpoint of detection sensitivity, it is preferable that a given straight line next to a given straight line passes near the center of a corresponding resistor-placement region next to the resistor-placement region.

In the strain gauge 100, the resistors 103a and 103b of which a longitudinal direction (longitudinal direction of a gauge) of each is directed to a circumferential direction of the outer ring 10 is disposed. The outer ring 10 in the circumferential direction thereof is likely to be stretched and contracted in comparison to the outer ring in an axial direction thereof, and thus by disposing the resistors of which the longitudinal direction of each is directed to the circumferential direction of the outer ring 10, a great distorted waveform can be obtained. In the following description, when the resistors 103a and 103b need not to be particularly distinguished, they may be referred to as resistors 103.

By monitoring the output of the strain gauge 100 through an external device, a wear state of the rolling bearing 1 can be monitored. The strain gauge 100 will be described below in detail.

Figure 3:
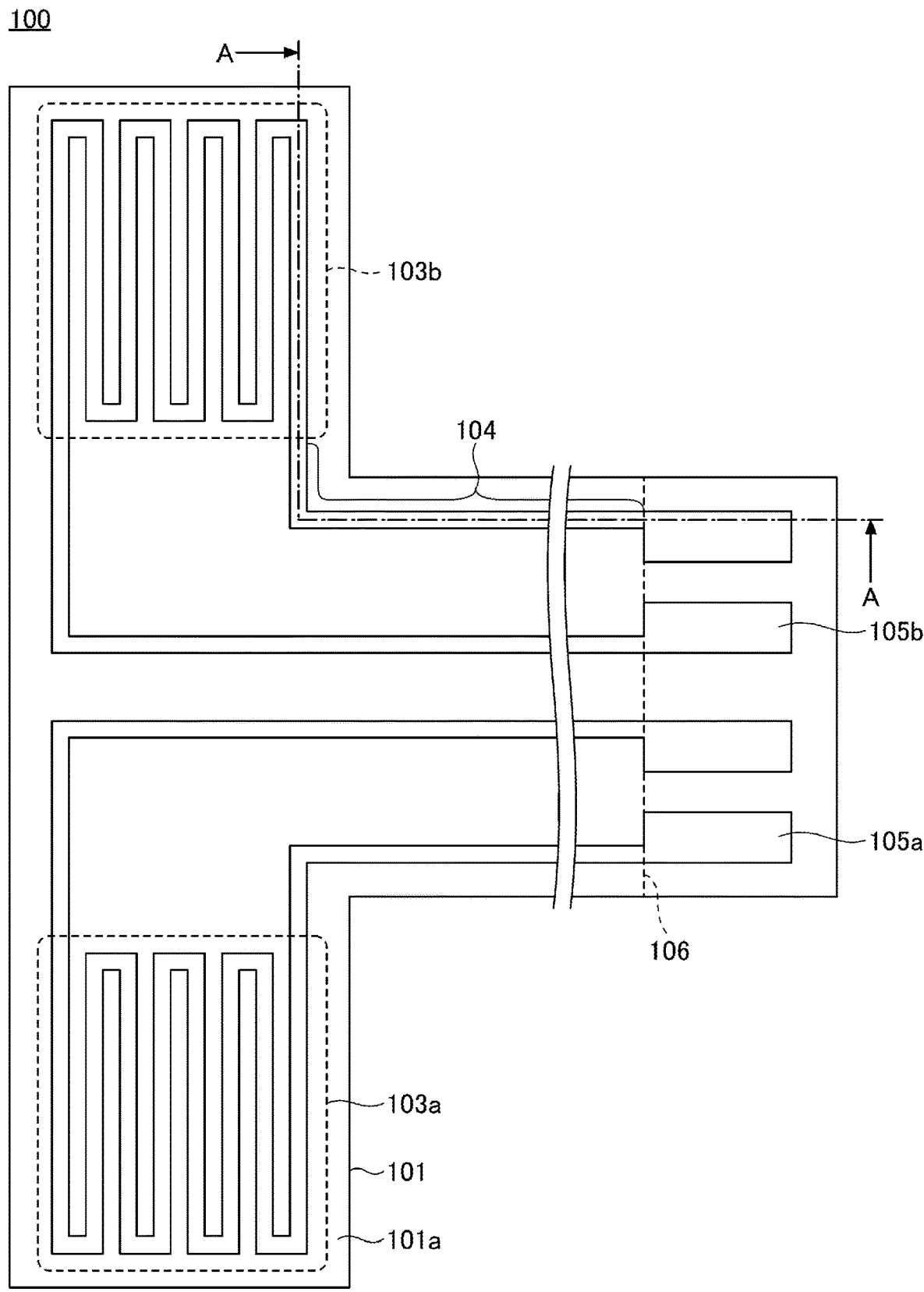
FIG. 3 is a plan view of an example of a strain gauge according to the first embodiment.
Figure 4:
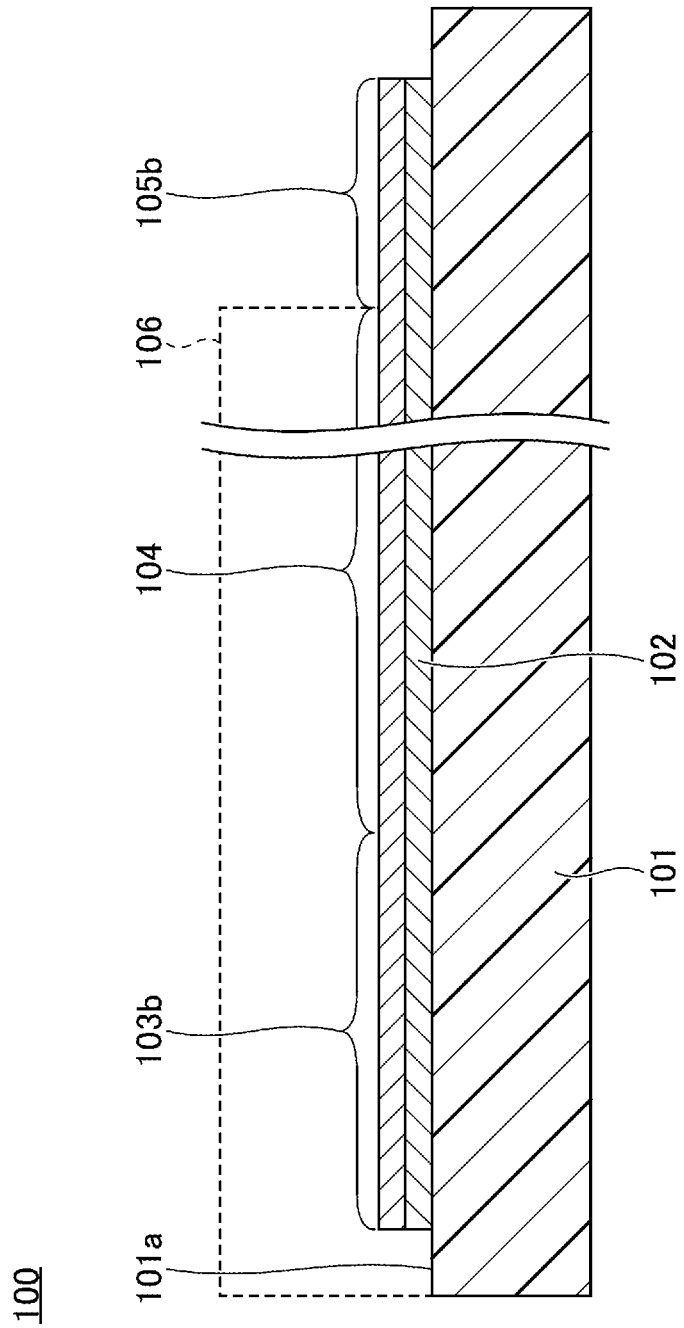
FIG. 4 is a cross-sectional view of an example of the strain gauge according to the first embodiment.

FIG. 3 is a plan view of an example of the strain gauge according to the first embodiment. FIG. 4 is a cross-sectional view of an example of the strain gauge according to the first embodiment, and illustrates a cross section taken along the A-A line in FIG. 3. Referring to FIG. 3 and FIG. 4, the strain gauge 100 includes a substrate 101, a functional layer 102, the resistors 103a and 103b, lines 104, and terminal sections 105a and 105b. The functional layer 102 may be provided as needed.

In the present embodiment, for the sake of convenience, with respect to the strain gauge 100, the side of the substrate 101 where the resistors 103 are provided is referred to as an upper side or one side, and the side of the substrate 101 where the resistors 103 are not provided is referred to as a lower side or another side. Further, for each component, the surface on the side where the resistors 103 are provided is referred to as one surface or an upper surface, and the surface on the side where the resistors 103 are not provided is referred to as another surface or a lower surface. However, the strain gauge 100 can be used in a state of being upside down, or can be disposed at any angle. Further, a plan view means that an object is viewed from a direction normal to an upper surface 101a of the substrate 101, and a planar shape refers to a shape of an object when viewed from the direction normal to the upper surface 101a of the substrate 101.

The substrate 101 is a member that is a base layer for forming the resistors 103 or the like and is flexible. The thickness of the substrate 101 is not particularly restricted, and can be appropriately selected for any purpose. For example, such a thickness can be approximately between 5 μm and 500 μm. In particular, when the thickness of the substrate 101 is between 5 μm and 200 μm, it is preferable in terms of strain transfer from a flexure element surface that is bonded to a lower surface of the substrate 101 via an adhesive layer or the like, and dimensional stability with respect to environment, and when the thickness is 10 μm or more, it is further preferable in terms of insulation.

The substrate 101 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. The film refers to a flexible member having a thickness of about 500 μm or less.

Here, the "formed of an insulating resin film" is not intended to preclude the substrate 101 from containing fillers, impurities, or the like in the insulating resin film. The substrate 101 may be formed of, for example, an insulating resin film containing fillers such as silica or alumina.

The functional layer 102 is formed, as a lower layer of the resistors 103, on the upper surface 101a of the substrate 101. In such a manner, the planar shape of the functional layer 102 is approximately the same as the planar shape of the resistors 103 illustrated in FIG. 3. The thickness of the functional layer 102 may be, for example, about 1 nm to 100 nm.

In the present application, the functional layer refers to a layer that has a function of promoting crystal growth of the resistors 103 that are at least an upper layer. The functional layer 102 preferably further has a function of preventing oxidation of the resistors 103 caused by oxygen and moisture included in the substrate 101, as well as a function of improving adhesion between the substrate 101 and each resistor 103. The functional layer 102 may further have other functions.

The insulating resin film that constitutes the substrate 101 contains oxygen and moisture. In this regard, particularly when each resistor 103 includes Cr (chromium), it is effective for the functional layer 102 to have a function of preventing oxidation of the resistor 103, because Cr forms an autoxidized film.

The material of the functional layer 102 is not particularly restricted as long as it is material having a function of promoting crystal growth of the resistors 103 that is at least an upper layer. Such material can be appropriately selected for any purpose, and includes one or more types of metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

Each resistor 103 is a thin film formed in a predetermined pattern, on the upper surface of the functional layer 102, and is a sensitive portion at which resistance changes in accordance with strain.

The resistors 103 can be each formed of, for example, material including Cr (chromium), material including Ni (nickel), or material including both of Cr and Ni. In other words, the resistors 103 can be each formed of material including at least one from among Cr and Ni. An example of the material including Cr includes a Cr composite film. An example of the material including Ni includes Cu—Ni (copper nickel). An example of the material including both of Cr and Ni includes Ni—Cr (nickel chromium).

In the following, for example, each resistor 103 will be described as a Cr composite film. The Cr composite film is a composite film of Cr, CrN, $Cr_2N$, and the like. The Cr composite film may include incidental impurities such as chromium oxide. A portion of the material constituting the functional layer 102 may be diffused into the Cr composite film. In this case, the material constituting the functional layer 102 and nitrogen may form a compound. For example, when the functional layer 102 is formed of Ti, the Cr composite film may include Ti or TiN (titanium nitride).

The thickness of each resistor 103 is not particularly restricted, and can be appropriately selected for any purpose. The thickness can be, for example, approximately between 0.05 μm and 2 μm. In particular, when the thickness of the resistor 103 is 0.1 μm or more, it is preferable in terms of increases in crystallinity (e.g., crystallinity of α-Cr) of a crystal that constitutes the resistor 103. When the thickness of the resistor 103 is 1 μm or less, it is further preferable in terms of reductions in cracks of a given film caused by internal stress of the film that constitutes the resistor 103, or reductions in warp in the substrate 101.

By forming the resistors 103 on the functional layer 102, the resistors 103a and 103b can be formed by a stable crystalline phase and thus stability of gauge characteristics (a gauge factor, a gauge factor temperature coefficient TCS, and a temperature coefficient of resistance TCR) can be increased.

For example, when each resistor 103 is the Cr composite film, by providing the functional layer 102, the resistor 103 can be formed with α-Cr (alpha-chromium) as the main component. The α-Cr has a stable crystalline phase and thus stability of gauge characteristics can be increased.

Here, a main component means that a target substance is 50% by weight or more of total substances that constitute the resistor. The resistor 103 preferably includes α-Cr at 80% by weight or more, from the viewpoint of increasing the gauge characteristics. Note that α-Cr is Cr having a bcc structure (body-centered cubic structure).

Also, by diffusing a metal (e.g., Ti) that constitutes the functional layer 102 into the Cr composite film, the gauge characteristics can be increased. Specifically, the gauge factor of the strain gauge 100 can be 10 or more, as well as the gauge factor temperature coefficient TCS and temperature coefficient of resistance TCR being each in the range of from −1000 ppm/° C. to +1000 ppm/° C.

The terminal sections 105a respectively extend from both end portions of the resistor 103a, via the lines 104 and are each wider than the resistor 103a and a given line 104 to be in an approximately rectangular shape, in a plan view. The terminal sections 105a are a pair of electrodes for externally outputting changes in a resistance value of the resistor 103a in accordance with strain, where, for example, a lead wire for an external connection, or the like is joined. For example, the resistor 103a extends from one terminal section 105a and one line 104, with zigzagged hairpin turns, to be connected to another line 104 and another terminal section 105a. The upper surface of each terminal section 105a may be coated with a metal allowing for greater solderability than the terminal section 105a.

The terminal sections 105b respectively extend from both end portions of the resistor 103b, via the lines 104 and are each wider than the resistor 103b and a given line 104 to be in an approximately rectangular shape, in a plan view. The terminal sections 105b are a pair of electrodes for externally outputting changes in a resistance value of the resistor 103b in accordance with strain, where, for example, a lead wire for an external connection, or the like is joined. For example, the resistor 103b extends from one terminal section 105b and one line 104, with zigzagged hairpin turns, to be connected to another line 104 and another terminal section 105b. The upper surface of each terminal section 105b may be coated with a metal allowing for greater solderability than the terminal section 105b.

Note that for the sake of convenience, the resistors 103a and 103b, the lines 104, and the terminal sections 105a and 105b are expressed by different numerals. However, the resistors, the lines, and the terminal sections can be integrally formed of the same material, in the same process. In the following description, when the terminal sections 105a and 105b need not to be particularly distinguished, they may be referred to as terminal sections 105.

A cover layer 106 (insulating resin layer) may be provided on and above the upper surface 101a of the substrate 101, such that the resistors 103 and the lines 104 are coated and the terminal sections 105 are exposed. By providing the cover layer 106, mechanical damage and the like can be prevented from occurring in the resistors 103 and the lines 104. Also, by providing the cover layer 106, the resistors 103 and the lines 104 can be protected against moisture and the like. The cover layer 106 may be provided to cover all portions except for the terminal sections 105.

The cover layer 106 can be formed of an insulating resin such as a PI resin, an epoxy resin, a PEEK resin, a PEN resin, a PET resin, or a PPS resin, a composite resin (e.g., a silicone resin or a polyolefin resin). The cover layer 106 may contain fillers or pigments. The thickness of the cover layer 106 is not particularly restricted, and can be appropriately selected for any purpose. For example, the thickness may be approximately between 2 µm and 30 µm.

In order to manufacture the strain gauge 100, first, the substrate 101 is prepared and the functional layer 102 is formed on the upper surface 101a of the substrate 101. The material and thickness for each of the substrate 101 and the functional layer 102 are the same as the material and thickness described above. The functional layer 102 may be provided as necessary.

The functional layer 102 can be vacuum-deposited by, for example, conventional sputtering in which a raw material capable of forming the functional layer 102 is a target and in which an Ar (argon) gas is supplied to a chamber. By using conventional sputtering, the functional layer 102 is deposited while the upper surface 101a of the substrate 101 is etched with Ar. Thus, a deposited amount of film of the functional layer 102 is minimized and thus an effect of increasing adhesion can be obtained.

However, this is an example of a method of depositing the functional layer 102, and the functional layer 102 may be formed by other methods. For example, as such a method, before depositing the functional layer 102, the upper surface 101a of the substrate 101 is activated by plasma treatment or the like using Ar or the like to thereby obtain the effect of increasing the adhesion, and subsequently the functional layer 102 may be vacuum-deposited by magnetron sputtering.

Next, a metallic layer that includes the resistors 103, the lines 104, and the terminal sections 105 is formed on the entire upper surface of the functional layer 102, and then the functional layer 102, the resistors 103, the lines 104, and the terminal sections 105 are each patterned in the planar shape as illustrated in FIG. 3, by photolithography. The material and thickness for each of the resistors 103, the lines 104, and the terminal sections 105 are the same as the material and thickness described above. The resistors 103, the lines 104, and the terminal sections 105 can be integrally formed of the same material. The resistors 103, the lines 104, and the terminal sections 105 can be deposited by, for example, magnetron sputtering in which a raw material capable of forming the resistors 103, the lines 104, and the terminal sections 105 is a target. Instead of the magnetron sputtering, the resistors 103, the lines 104, and the terminal sections 105 may be deposited by reactive sputtering, vapor deposition, arc ion plating, pulsed laser deposition, or the like.

A combination of the material of the functional layer 102 and the material of the resistors 103, the lines 104, and the terminal sections 105 is not particularly restricted, and can be appropriately selected for any purpose. For example, Ti is used for the functional layer 102, and a Cr composite film formed with α-Cr (alpha-chromium) as the main component can be deposited as the resistors 103, the lines 104, and the terminal sections 105.

In this case, each of the resistors 103, the lines 104, and the terminal sections 105 can be deposited by, for example, magnetron sputtering in which a raw material capable of forming the Cr composite film is the target and in which an Ar gas is supplied to a chamber. Alternatively, the resistors 103, the lines 104, and the terminal sections 105 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer 102 formed of Ti, and a Cr composite film that is formed with α-Cr as the main component having a stable crystalline structure can be deposited. Also, Ti that constitutes the functional layer 102 is diffused into the Cr composite film, so that the gauge characteristics are increased. For example, the gauge factor of the strain gauge 100 can be 10 or more, as well as the gauge factor temperature coefficient TCS and temperature coefficient of resistance TCR being each in the range of from −1000 ppm/° C. to +1000 ppm/° C.

When each resistor 103 is a Cr composite film, the functional layer 102 formed of Ti includes all functions of a function of promoting crystal growth of the resistor 103, a function of preventing oxidation of the resistor 103 caused by oxygen or moisture contained in the substrate 101, and a function of increasing adhesion between the substrate 101 and the resistor 103. Instead of Ti, when the functional layer 102 is formed of Ta, Si, Al, or Fe, the functional layer also includes the same functions.

Subsequently, the cover layer 106 with which the resistors 103 and the lines 104 are coated and that exposes the terminal sections 105 is provided on and above the upper surface 101a of the substrate 101, as necessary, so that the strain gauge 100 is completed. For example, the cover layer 106 can be fabricated such that a thermosetting insulating resin film in a semi-cured state is laminated on the upper surface 101a of the substrate 101, and such that the resistors 103 and the lines 104 are coated and the terminal sections 105 are exposed; subsequently, heat is added and curing is performed. The cover layer 106 may be formed such that a thermosetting insulating resin that is liquid or paste-like is applied to the upper surface 101a of the substrate 101, and such that the resistors 103 and the lines 104 are coated therewith and the terminal sections 105 are exposed; subsequently, heat is added and curing is performed.

As described above, by providing the functional layer 102 in the lower layer of the resistors 103, the crystal growth of the resistors 103 can be promoted and thus the resistors 103 having a stable crystalline phase can be fabricated. As a result, in the strain gauge 100, the stability of the gauge characteristics can be increased. Also, the material that constitutes the functional layer 102 is diffused into the resistors 103, so that the gauge characteristics of the strain gauge 100 can be thereby increased.

[Bearing Monitoring Apparatus]

Figure 5:
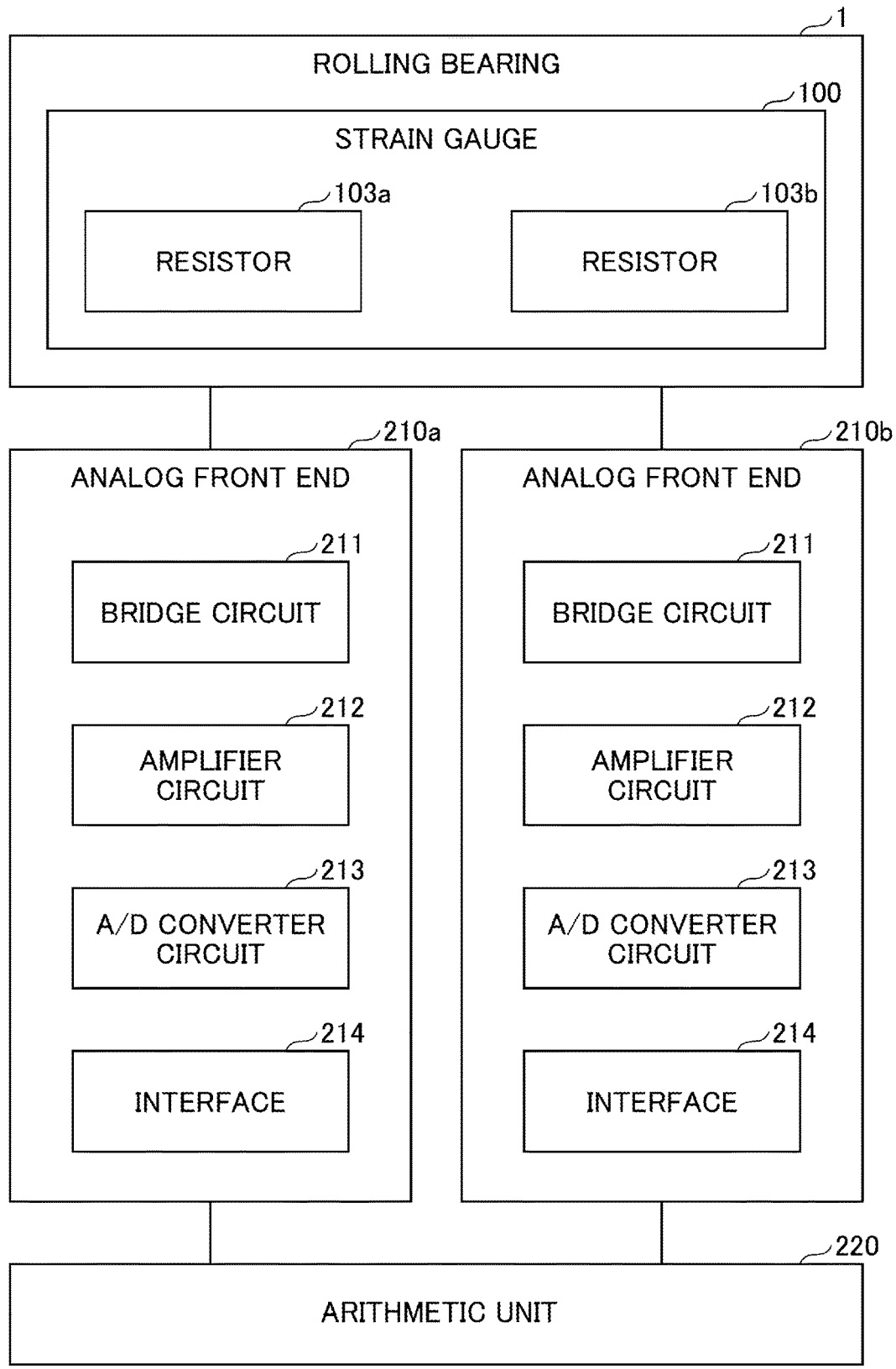
FIG. 5 is a block diagram illustrating an example of a bearing monitoring apparatus according to the first embodiment.

FIG. 5 is a block diagram illustrating an example of a bearing monitoring apparatus according to the first embodiment. Referring to FIG. 5, a bearing monitoring apparatus 200 includes the rolling bearing 1, analog front ends 210a and 210b, and an arithmetic unit 220.

In the bearing monitoring apparatus 200, a pair of terminal sections 105a in the strain gauge 100 for the rolling bearing 1 are connected to the analog front end 210a by using, for example, a flexible substrate, a lead wire, or the like.

The analog front end 210a includes, for example, a bridge circuit 211, an amplifier circuit 212, an A/D converter circuit (analog-to-digital converter circuit) 213, an interface 214, and the like, and generates a first distorted waveform based on the output of the resistor 103a. The analog front end 210a may include a temperature compensating circuit. The analog front end 210a may be constituted by one or more ICs, or may be configured by individual components.

In the analog front end 210a, for example, the pair of terminal sections 105a in the strain gauge 100 is connected to the bridge circuit 211. In other words, one side of the bridge circuit 211 is constituted by the resistor 103a between the pair of terminal sections 105a, and the other three sides are each constituted by fixed resistance. With this arrangement, the first distorted waveform (analog signal) corresponding to a resistance value of the resistor 103a can be obtained as the output of the bridge circuit 211. The analog front end 210a is a representative example of a waveform generator according to the present invention.

In the analog front end 210a, after the first distorted waveform output from the bridge circuit 211 is amplified by the amplifier circuit 212, the amplified first distorted waveform is converted into a digital signal by the A/D converter circuit 213. Then, the digital signal is output to the arithmetic unit 220 through the interface 214 by serial communication such as I²C. When the analog front end 210a includes a temperature compensating circuit, a temperature-compensated digital signal is transmitted to the arithmetic unit 220.

A pair of terminal sections 105b of the strain gauge 100 for the rolling bearing 1 is connected to the analog front end 210b by using, for example, a flexible substrate, a lead line, or the like.

The analog front end 210b has the same function as the analog front end 210a, and generates a second distorted waveform based on the output of the resistor 103b. The analog front end 210b, as the analog front end 210a, may be formed as one IC.

In the analog front end 210b, for example, the pair of terminal sections 105b in the strain gauge 100 is connected to a bridge circuit 211. In other words, one side of the bridge circuit 211 is constituted by the resistor 103b between the pair of terminal sections 105b, and the other three sides are each constituted by fixed resistance. With this arrangement, the second distorted waveform (analog signal) corresponding to a resistance value of the resistor 103b can be obtained as the output of the bridge circuit 211. The analog front end 210b is a representative example of a waveform generator according to the present invention.

In the analog front end 210b, after the second distorted waveform output from the bridge circuit 211 is amplified by the amplifier circuit 212, the amplified second distorted waveform is converted into a digital signal by the A/D converter circuit 213. Then, the digital signal is output to the arithmetic unit 220 through the interface 214 by serial communication such as I²C. When the analog front end 210b includes a temperature compensating circuit, a temperature-compensated digital signal is transmitted to the arithmetic unit 220.

The arithmetic unit 220 performs arithmetic processing with respect to digitized first and second distorted waveforms that are respectively transmitted from the analog front ends 210a and 210b, and monitors a wear state of the rolling bearing 1. For example, the arithmetic unit 220 monitors a wear state of the rolling bearing 1, based on the amplitude or period of the digitalized distorted waveforms. The arithmetic processing includes, for example, subtracting of the second distorted waveform from the first distorted waveform to thereby generate a differential waveform, or comparing of the differential waveform against a reference value.

Figure 6:
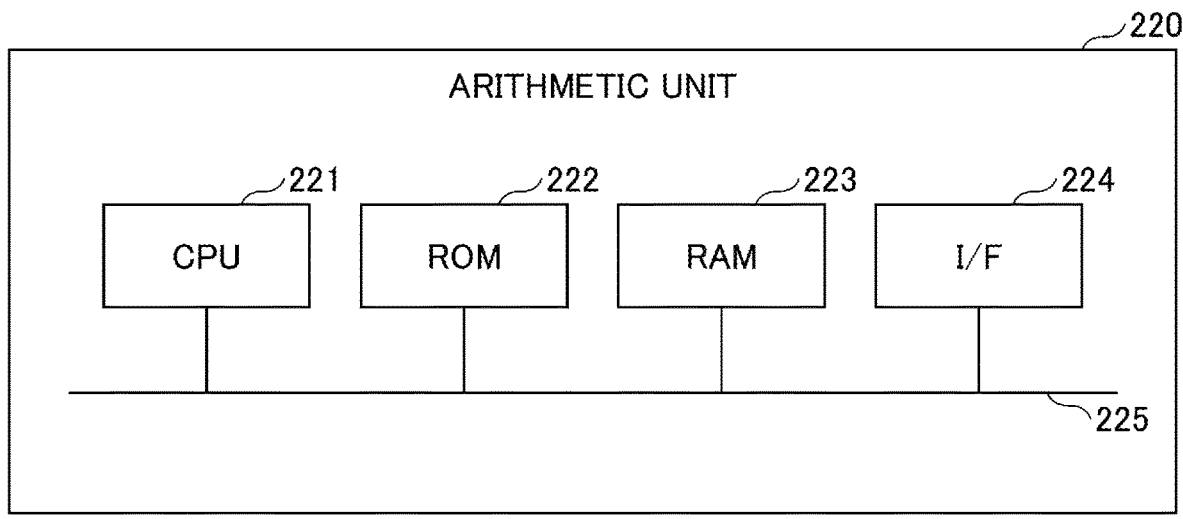
FIG. 6 is a hardware block diagram of an arithmetic unit according to the first embodiment.

FIG. 6 is a hardware block diagram of an example of the arithmetic unit according to the first embodiment. As illustrated in FIG. 6, the arithmetic unit 220 includes main components that are a central processing unit (CPU) 221, a read only memory (ROM) 222, a random access memory (RAM) 223, an interface (I/F) 224, and a bus line 225. The CPU 221, the ROM 222, the RAM 223, and the I/F 224 are interconnected via the bus line 225. The arithmetic unit 220 may have another hardware block as necessary.

The CPU 221 controls each function of the arithmetic unit 220. The ROM 222, which is a storage device, stores a program that causes the CPU 221 to control each function of the arithmetic unit 220, as well as storing various information. The RAM 223, which is a storage device, is used as a work area or the like of the CPU 221. The RAM 223 can temporarily store predetermined information. The I/F 224 is an interface for coupling to another device or the like. For example, the I/F 224 is coupled with the analog front ends 210a and 210b, an external network, or the like.

The arithmetic unit 220 may be a processor programmed to implement each function by software, as in a processor that is implemented by an electronic circuit. The arithmetic unit 220 may include an application specific integrated circuit (ASIC) designed to implement a predetermined function. The arithmetic unit 220 may include a digital signal processor (DSP), a field programmable gate array (FPGA), a system on a chip (SOC), or a graphics processing unit (GPU). The arithmetic unit 220 may be a circuit module or the like.

Figure 7:
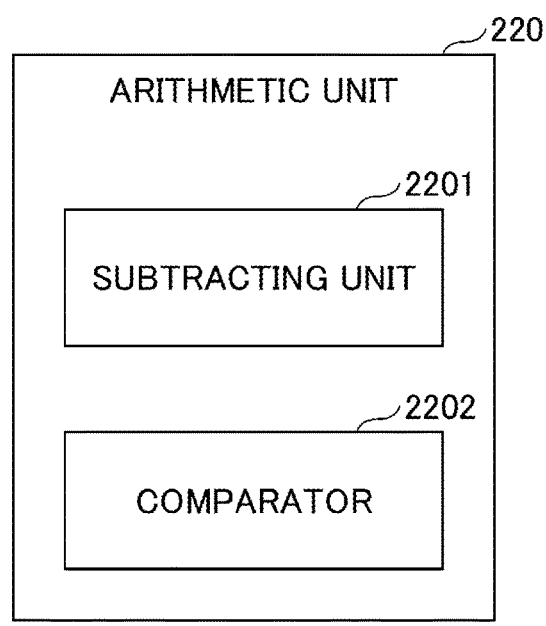
FIG. 7 is a functional block diagram of the arithmetic unit according to the first embodiment.

FIG. 7 is a functional block diagram of an example of the arithmetic unit according to the first embodiment. As illustrated in FIG. 7, the arithmetic unit 220 includes main functional blocks that are a subtracting unit 2201 and a comparator 2202. The arithmetic unit 220 may include another functional block as necessary.

The subtracting unit 2201 includes a function of subtracting the second distorted waveform from the digitalized first distorted waveform to generate a differential waveform between the first distorted waveform and the second distorted waveform. The comparator 2202 includes a function of comparing the differential waveform generated by the subtracting unit 2201, against a predetermined reference value. The arithmetic unit 220 may have another function as necessary.

Figure 8:
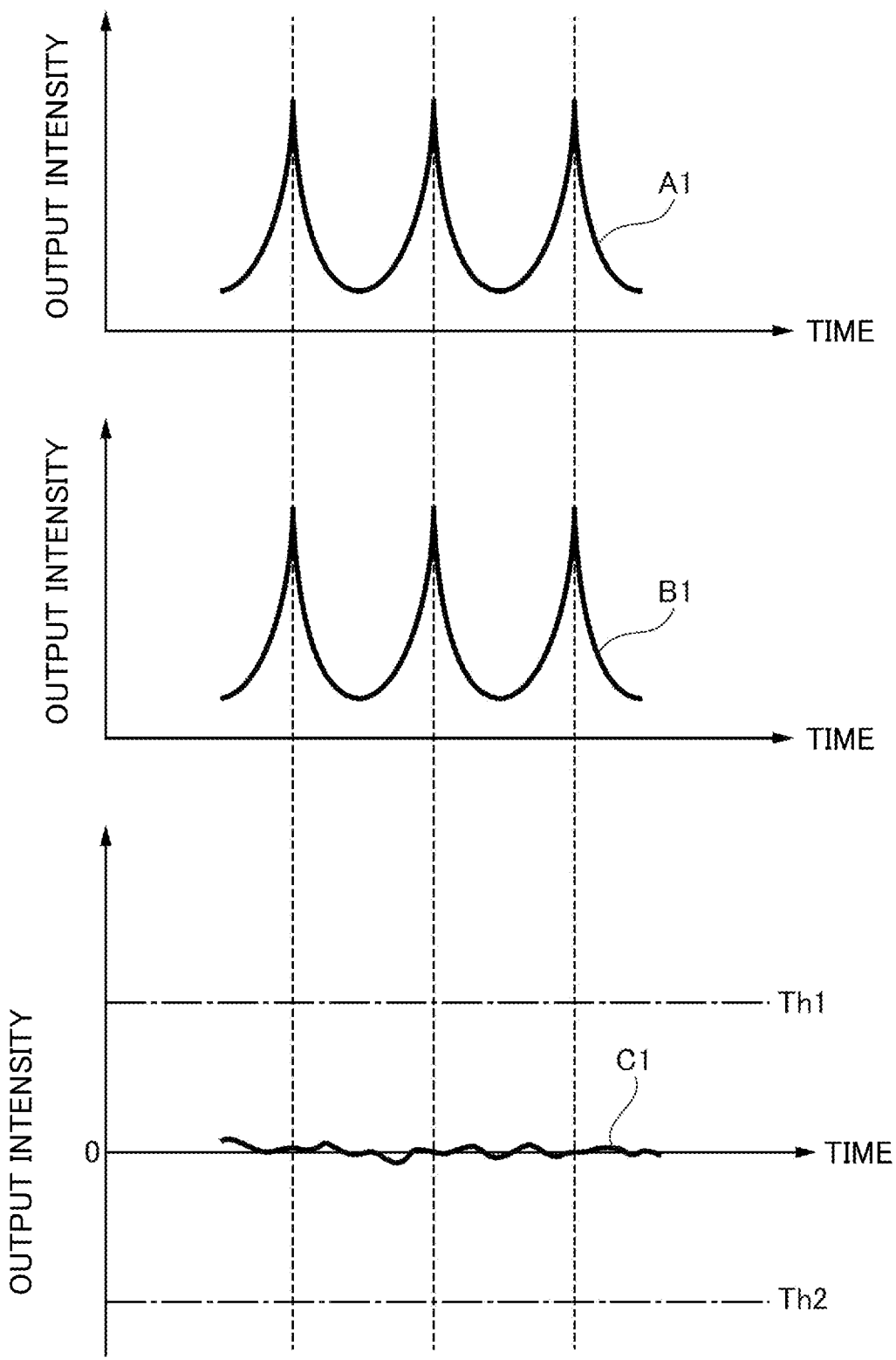
FIG. 8 is a diagram illustrating an example of initial distorted waveforms that an analog front end generates.

FIG. 8 is a diagram illustrating an example of initial distorted waveforms generated by the analog front end. FIG. 8 illustrates a first distorted waveform (A1), a second distorted waveform (B1), and a differential waveform (C1).

In general, distorted waveforms are periodic waveforms of which peaks and bottoms are repeated. When each rolling element 30 passes directly beneath each of the resistors 103a and 103b of the strain gauge 100, the peak for a strain amount (output intensity) is obtained. Also, the bottom is obtained at an intermediate position between rolling elements 30 that are next to each other. A rotation speed of the rolling bearing 1 can be determined by detecting the number of peaks for the strain amount that appear during a fixed time period.

As illustrated in FIG. 8, variations in each of an amplitude and period for the initial distorted waveform are small at passing positions of rolling elements 30 that are next to each other.

In other words, for the first distorted waveform (A1) generated based on a detected value of the resistor 103a, and the second distorted waveform (B1) generated based on a detected value of the resistor 103b, their amplitudes and periods are substantially the same. As a result, the output of the differential waveform (C1) that is obtained by subtracting the second distorted waveform (B1) from the first distorted waveform (A1) is approximately zero.

Figure 9:
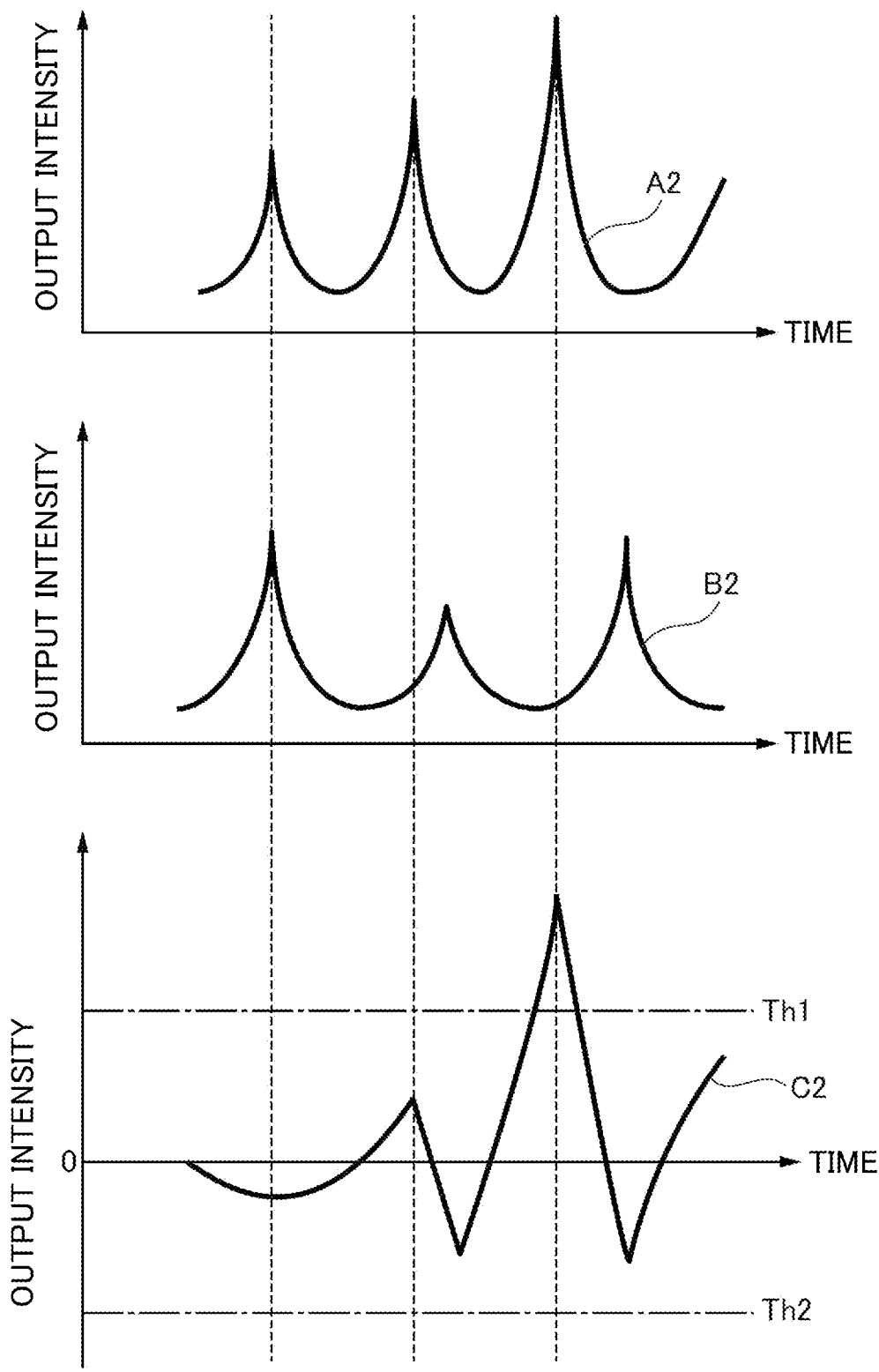
FIG. 9 is a diagram illustrating an example of distorted waveforms that the analog front end generates after the passage of a predetermined time period.

FIG. 9 illustrates distorted waveforms generated by the analog front end after the passage of a predetermined time period. FIG. 9 illustrates a first distorted waveform (A2), a second distorted waveform (B2), and a differential waveform (C2).

As illustrated in FIG. 9, after operations for the predetermined time period, variations in each of the amplitude and period that are obtained at passing positions of rolling elements 30 that are next to each other are increased, because the rolling elements 30 may slip due to wearing of the race or one or more rolling elements 30. For example, when the race in the rolling bearing 1 becomes worn, the period of a given distorted waveform varies. Thus, when one or more rolling elements become worn, the output intensity varies accordingly.

In other words, for the first distorted waveform (A2) generated based on a detected value of the resistor 103a, and the second distorted waveform (B2) generated based on a detected value of the resistor 103b, variations in each of their amplitudes and periods occur. As a result, the differential waveform (C2) that is obtained by subtracting the second distorted waveform (B2) from the first distorted waveform (A2) is not approximately zero, and consequently the waveform of which output intensity varies greatly is obtained.

As described above, each of the amplitude and period of a given distorted waveform varies due to wearing of the race or one or more rolling elements. In view of the point described above, the arithmetic unit 220 can monitor a wear state of the rolling bearing 1, based on the differential waveform.

Figure 10:
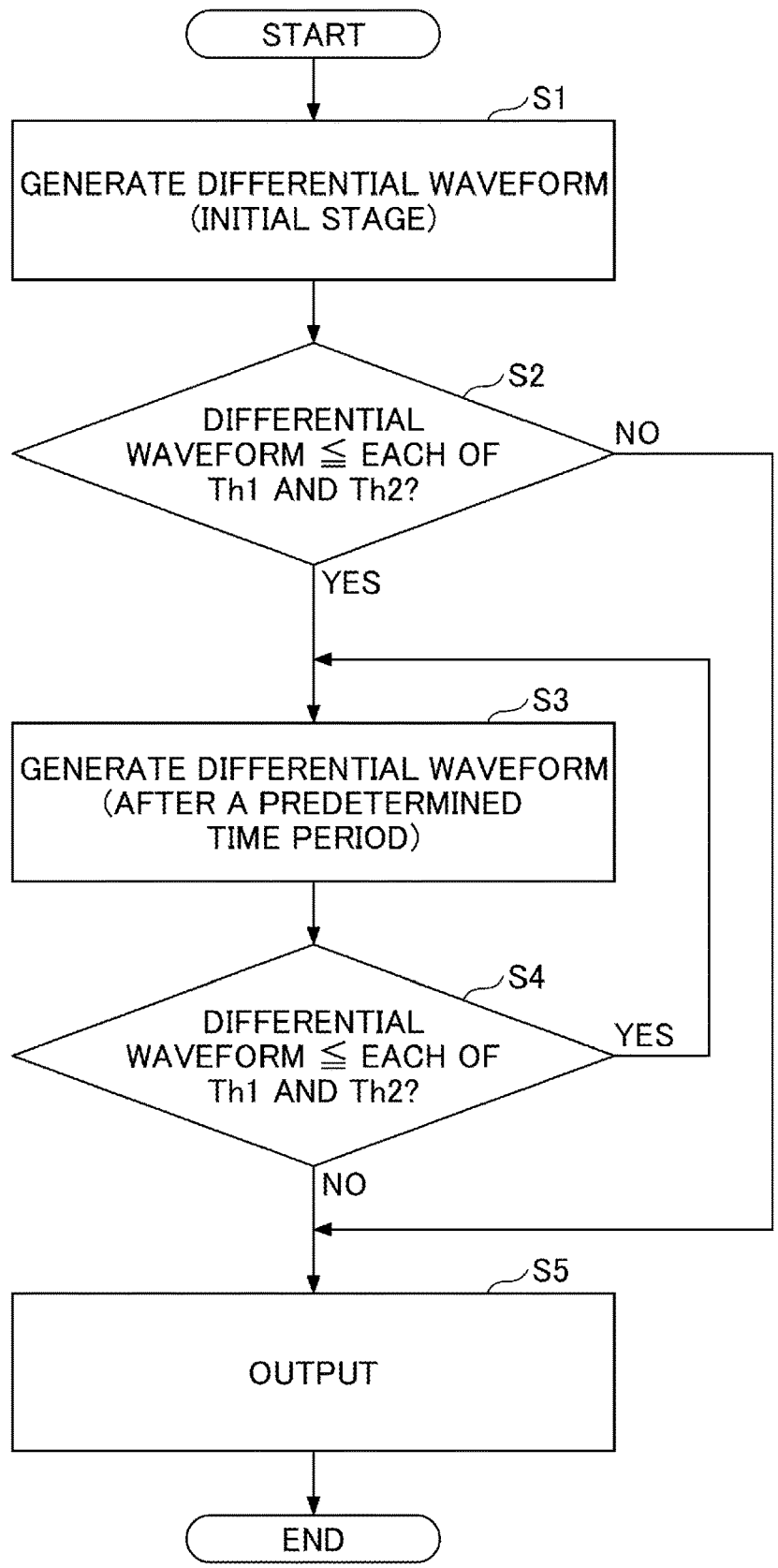
FIG. 10 is a flowchart illustrating an example of a method for monitoring a bearing executed by the bearing monitoring apparatus according to the first embodiment.

FIG. 10 is a flowchart illustrating an example of the method for monitoring a bearing executed by the bearing monitoring apparatus according to the first embodiment. In step S1 illustrated in FIG. 10, the subtracting unit 2201 obtains, from the analog front ends 210a and 210b, data indicating an initial first distorted waveform and second distorted waveform, subtracts the second distorted waveform from the first distorted waveform, and generates an initial differential waveform.

Next, in step S2, the comparator 2202 compares the initial differential waveform against each of thresholds Th1 and Th2, and detects a wear state of the rolling bearing 1. The thresholds Th1 and Th2 are set taking into account a wear state to be detected, and are preliminarily stored in the RAM or the like.

In step S2, if the differential waveform exceeds at least one among the thresholds Th1 and Th2 (NO), the process proceeds to step S5, and then the comparator 2202 outputs an indication that an initial failure occurs (data output, generation of an alarm sound, lighting of a warning light, or the like). In step S2, if the differential waveform is less than or equal to each of the thresholds Th1 and Th2 (YES), the process proceeds to step S3.

For example, in step S2, if the waveforms illustrated in FIG. 8 are obtained, the differential waveform (C1) is less than or equal to each of the thresholds Th1 and Th2. Thus, it is confirmed that the wear state of the rolling bearing 1 is not abnormal in an initial stage and the rolling bearing 1 is operated normally. In this case, the process proceeds to step S3.

Next, in step S3, the subtracting unit 2201 obtains data indicative of the first distorted waveform and second distorted waveform after the passage of a predetermined time period. The subtracting unit 2201 subtracts the second distorted waveform from the first distorted waveform, and generates the differential waveform after the passage of the predetermined time period.

Next, in step S4, the comparator 2202 compares, against each of the thresholds Th1 and Th2, the differential waveform after the passage of the predetermined time period, and detects the wear state of the rolling bearing 1. In step S4, if the differential waveform exceeds at least one among the thresholds Th1 and Th2 (NO), the process proceeds to step S5, and then the comparator 2202 externally outputs an indication that the rolling bearing 1 becomes at a wear state that is preset (data output, generation of an alarm sound, lighting of a warning light, or the like). In step S4, if the differential waveform is less than or equal to each of the thresholds Th1 and Th2 (YES), the process proceeds to step S3 again, and then each of the subtracting unit 2201 and the comparator 2202 repeats the above-described operation.

For example, in step S4, if the waveforms illustrated in FIG. 9 are obtained, the rolling bearing 1 at such a timing becomes at the preset wear state, because the differential waveform (C2) exceeds the threshold Th1. In this case, the process proceeds to step S5, and then the comparator 2202 externally outputs an indication that the rolling bearing 1 becomes at the preset wear state (data output, generation of an alarm sound, lighting of a warning light, or the like).

The above-mentioned criteria for determining wearing is one example, and there is no limitation to the example described above. For example, if the number of times that the differential waveform exceeds both the thresholds Th1 and Th2 is one or more, the rolling bearing 1 may be determined to become at a determined wear state. If the number of times that the differential waveform exceeds both the thresholds is a predetermined number or more, the rolling bearing 1 may be determined to become at a determined wear state. Another determination criteria may be adopted.

Also, each of the thresholds Th1 and Th2 is an example of a reference value for comparison with the differential waveform after the passage of a predetermined time period. There is no limitation to the example described above. For example, the initial differential waveform is used as a reference value, and if the change from the initial differential waveform, to the differential waveform obtained after the passage of a predetermined time period, is greater than or equal to a predetermined level, it may be determined that a predetermined wear state is reached.

The strain gauge 100 using a Cr composite film as the material of the resistor 103 becomes highly sensitive (500% or more compared to conventional strain gauges) and is made compact (1/10 or less compared to the conventional strain gauges). For example, the output of the conventional strain gauges is about 0.04 mV/2 V, while the output of the strain gauge 100 can be 0.3 mV/2 V or more. Also, the size (gauge length×gauge width) of the conventional strain gauges is about 3 mm×3 mm, while the size (gauge length× gauge width) of the strain gauge 100 can be reduced to about 0.3 mm×0.3 mm.

As described above, the strain gauge 100 using the Cr composite film as the material of the resistor 103 is made compact, and thus the strain gauge 100 can be easily attached to a desired location of the rolling bearing 1. Also, the strain gauge 100 using the Cr composite film as the material of the resistor 103 is highly sensitive and thus small displacement can be detected. Accordingly, minute strain, which was difficult to be detected in the past, can be detected. In other words, with use of the strain gauge 100 using the Cr composite film as the material of the resistor 103, the rolling bearing 1 having a function of accurately detecting strain can be achieved. As a result, the bearing monitoring apparatus 200 that can detect a wear state of the rolling bearing 1 can be achieved.

In the rolling bearing 1, there might be both cases in which the outer ring 10 rotates and the inner ring 20 rotates. If the outer ring 10 rotates, the strain gauge 100 is disposed on the inner peripheral surface or end surface of the inner ring 20, and if the inner ring 20 rotates, the strain gauge 100 is disposed on the outer peripheral surface or end surface of the outer ring 10.

In this regard, the description above provides an example in which the strain gauge 100 is attached to the outer ring 10, where the inner ring 20 rotates. If the outer ring 10 in the rolling bearing 1 rotates, the strain gauge 100 is attached to the inner ring 20, thereby obtaining the same effect as that described above. The same applies to the following embodiments.

<Modification of the First Embodiment>

The modification of the first embodiment provides an example of the rolling bearing having the strain gauge, which differs from that according to the first embodiment. In the modification of the first embodiment, the description for the same components as those that have been described in the embodiment may be omitted.

Figure 11:
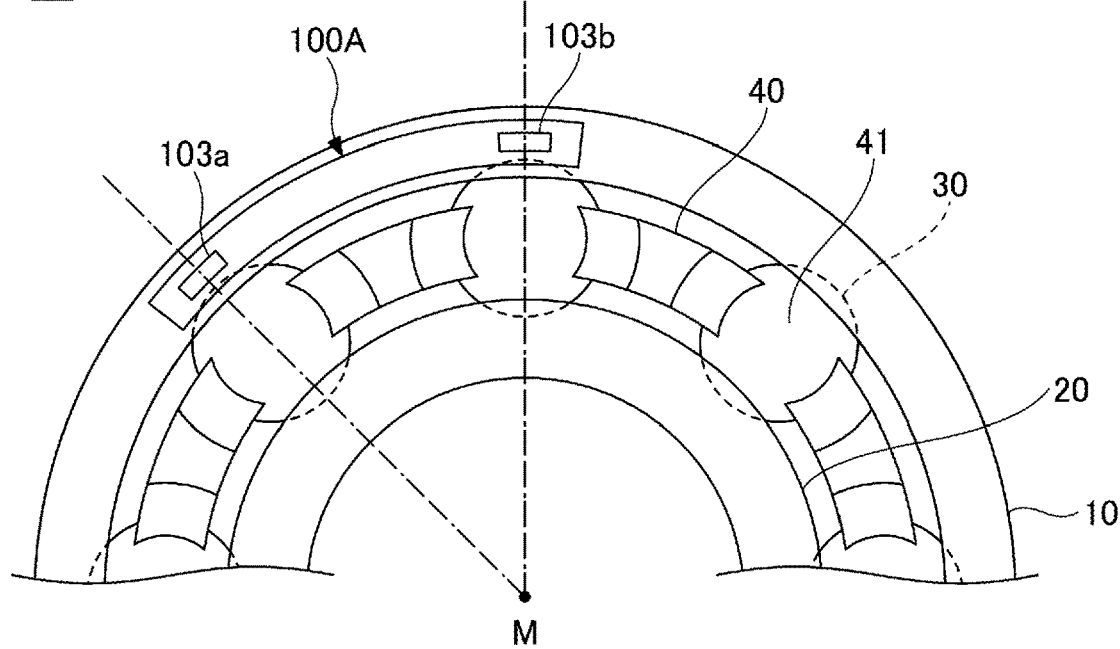
FIG. 11 is a partial front view of an example of the rolling bearing according to a first modification of the first embodiment.

FIG. 11 is a partial front view of an example of the rolling bearing according to a first modification of the first embodiment. Referring to FIG. 11, a rolling bearing 1A differs from the rolling bearing 1 (see FIG. 2 and the like) in that a strain gauge 100A is used instead of the strain gauge 100. In contrast to a case in which the strain gauge 100 is disposed on the outer peripheral surface of the outer ring 10, the strain gauge 100A is disposed in a circumferential direction of the outer ring 10 so as to be along one end surface of the outer ring.

The strain gauge 100A has the same configuration as the strain gauge 100, and is formed to have the shape that can be attached to the end surface of the outer ring 10. In the strain gauge 100A, the resistors 103a and 103b are arranged in an arrangement direction of rolling elements 30, so as to correspond to spacing between given rolling elements 30 that are next to each other.

In such a manner, the resistors serving as sensitive portions may be disposed on the end surface of the outer ring 10, instead of the outer peripheral surface of the outer ring 10. In the bearing monitoring apparatus 200 illustrated in FIG. 5, the strain gauge 100A is used instead of the strain gauge 100, and thus the wear state of the rolling bearing 1A can be monitored as in the rolling bearing 1.

Figure 12:
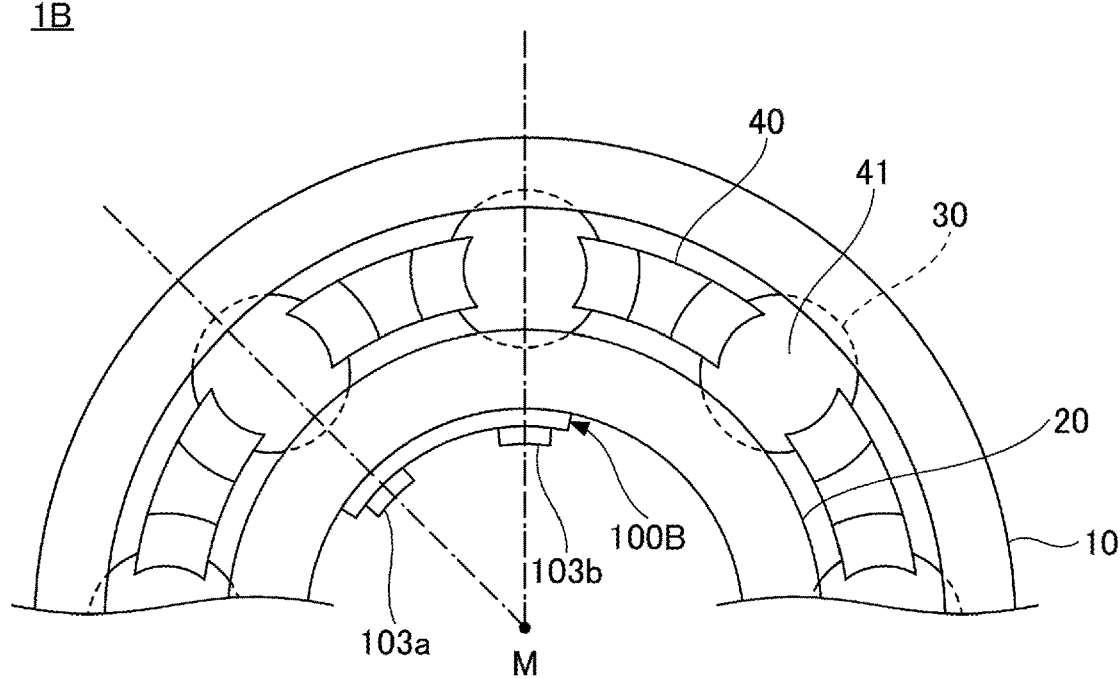
FIG. 12 is a partial front view of an example of the rolling bearing according to a second modification of the first embodiment.

FIG. 12 is a partial front view of an example of the rolling bearing according to a second modification of the first embodiment. Referring to FIG. 12, a rolling bearing 1B differs from the rolling bearing 1 (see FIG. 2 and the like) in that a strain gauge 100B is used instead of the strain gauge 100. In contrast to the case in which the strain gauge 100 is disposed on the outer peripheral surface of the outer ring 10, the strain gauge 100B is disposed in a circumferential direction of the inner ring 20 so as to be along an inner peripheral surface of the inner ring.

The strain gauge 100B has the same configuration as the strain gauge 100, and is formed to have the shape that can be attached to the inner peripheral surface of the inner ring 20. In the strain gauge 100B, the resistors 103a and 103b are arranged in an arrangement direction of rolling elements 30, so as to correspond to spacing between given rolling elements 30 that are next to each other.

In such a manner, the resistors serving as sensitive portions may be disposed on the inner peripheral surface of the inner ring 20, instead of the outer peripheral surface of the outer ring 10. In the bearing monitoring apparatus 200 illustrated in FIG. 5, the strain gauge 100B is used instead of the strain gauge 100, and thus the wear state of the rolling bearing 1B can be monitored as in the rolling bearing 1.

Figure 13:
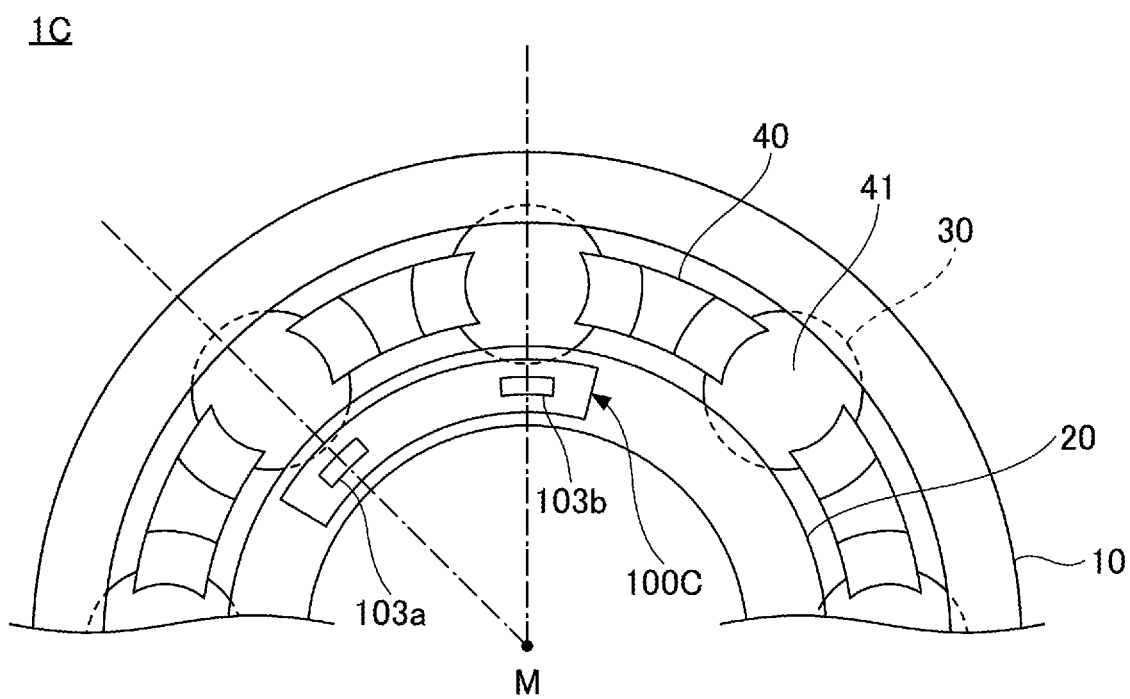
FIG. 13 is a partial front view of an example of the rolling bearing according to a third modification of the first embodiment.

FIG. 13 is a partial front view of an example of the rolling bearing according to a third modification of the first embodiment. Referring to FIG. 13, a rolling bearing 10 differs from the rolling bearing 1 (see FIG. 2 and the like) in that a strain gauge 100C is used instead of the strain gauge 100. In contrast to the case in which the strain gauge 100 is disposed on the outer peripheral surface of the outer ring 10, the strain gauge 100B is disposed in a circumferential direction of the inner ring 20 so as to be along an end surface of the inner ring.

The strain gauge 100C has the same configuration as the strain gauge 100, and is formed to have the shape that can be attached to one end surface of the inner ring 20. In the strain gauge 100C, the resistors 103a and 103b are arranged in an arrangement direction of rolling elements 30, so as to correspond to spacing between given rolling elements 30 that are next to each other.

In such a manner, the resistors serving as sensitive portions may be disposed on the end surface of the inner ring 20, instead of the outer peripheral surface of the outer ring 10. In the bearing monitoring apparatus 200 illustrated in FIG. 5, the strain gauge 100C is used instead of the strain gauge 100, and thus the wear state of the rolling bearing 10 can be monitored as in the rolling bearing 1.

As described above, in the rolling bearing, there might be both cases in which the outer ring 10 rotates and the inner ring 20 rotates. If a given strain gauge is attached to the inner ring 20 as in FIG. 12 and FIG. 13, the outer ring 10 rotates.

Figure 14:
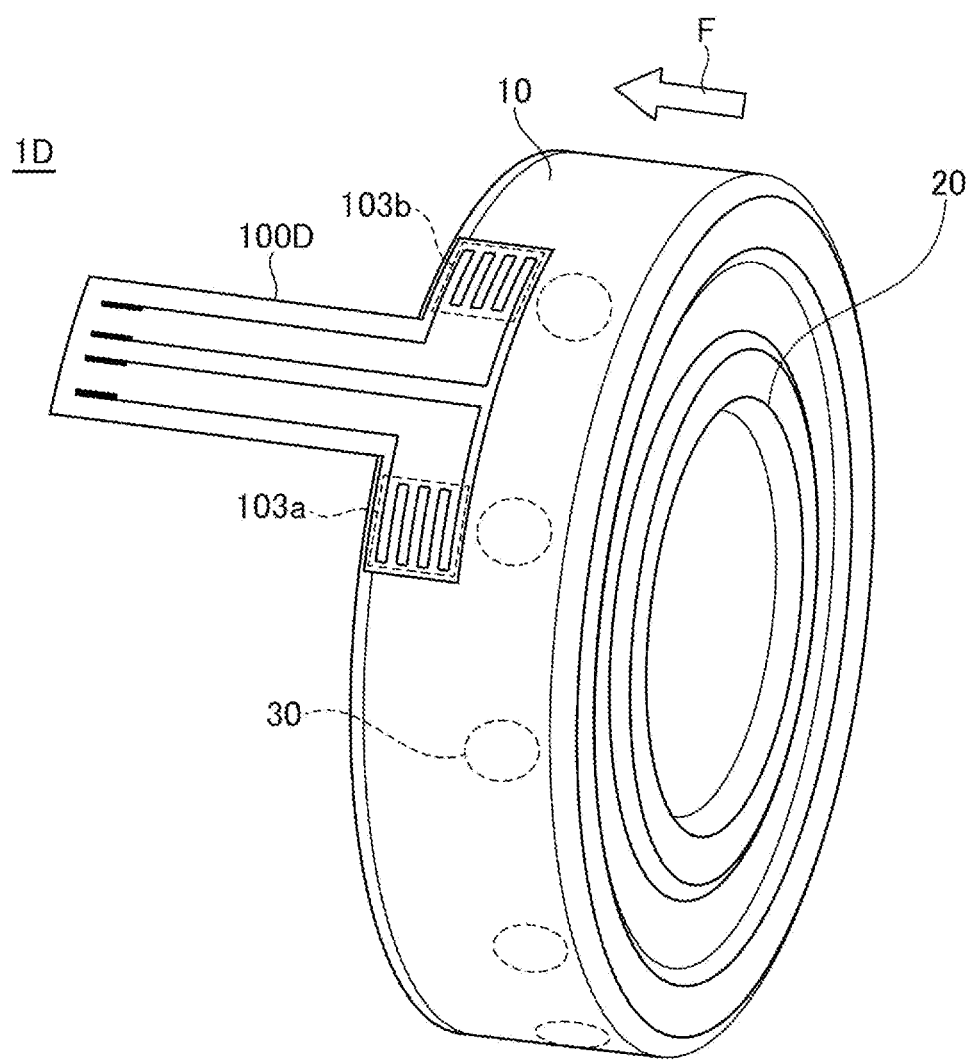
FIG. 14 is a perspective view of an example of the rolling bearing according to a fourth modification of the first embodiment.
Figure 15:
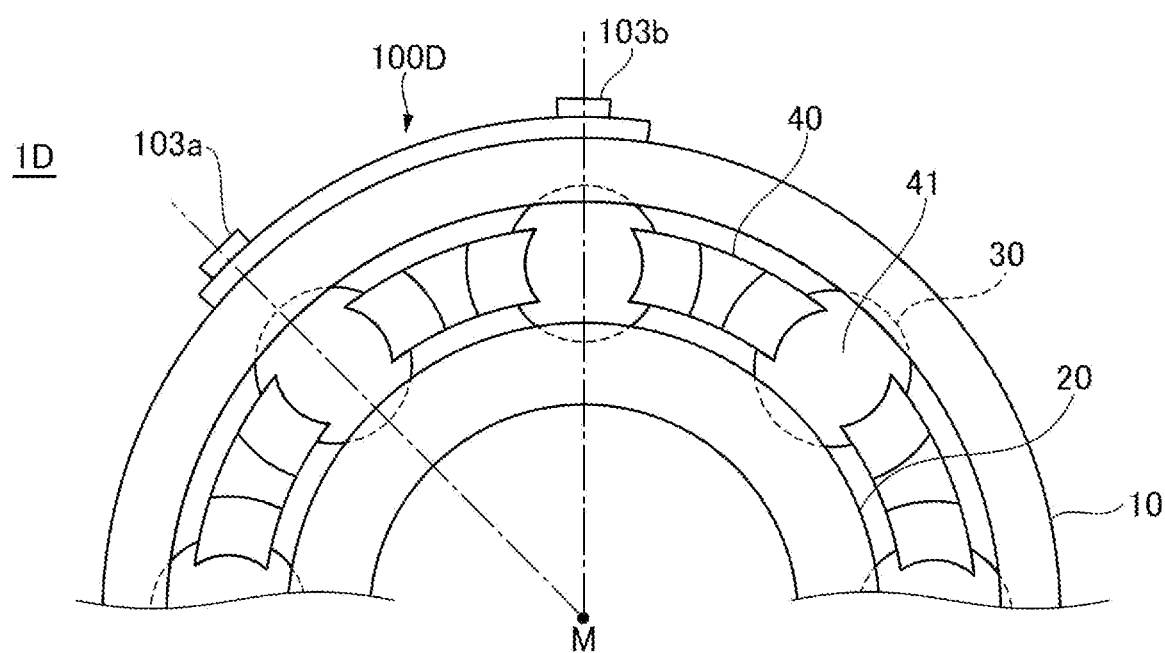
FIG. 15 is a partial front view of an example of the rolling bearing according to the fourth modification of the first embodiment.

FIG. 14 is a perspective view of an example of the rolling bearing according to a fourth modification of the first embodiment. FIG. 15 is a partial front view of an example of the rolling bearing according to the fourth modification of the first embodiment. Referring to FIG. 14 and FIG. 15, a rolling bearing 1D differs from the rolling bearing 1 (see FIG. 2 and the like) in that a strain gauge 100D is used instead of the strain gauge 100. A preload F is applied to the rolling bearing 1D in a direction, as expressed by the arrow, parallel to the axis of the rolling bearing.

In contrast to the case in which the strain gauge 100 is disposed on the entire outer peripheral surface of the outer ring 10 in a width direction, the strain gauge 100D is disposed on the side of the outer peripheral surface of the outer ring 10 opposite the preload. In the strain gauge 100D, the resistors 103a and 103b are arranged in the same direction as the arrangement direction of rolling elements 30, so as to correspond to spacing between given rolling elements 30 that are next to each other.

When the rolling bearing 1D is used in a rotating apparatus, the outer peripheral surface of the rolling bearing 1D is held by the inner peripheral surface of a housing (casing) by contact with the inner peripheral surface of the housing. However, an undercut is provided on the housing side, with respect to a providing portion of the strain gauge 100D, such that the strain gauge 100D does not contact the housing.

At the portion of the housing at which the undercut is provided, the outer peripheral surface of the rolling bearing 1D is not held by the inner peripheral surface of the housing, by contact with the inner peripheral surface of the housing. Particularly, when the undercut of the housing is located directly above a given rolling element 30 to which a great force is applied, the outer peripheral surface of the rolling bearing directly above the rolling element 30 is to be greatly distorted. When a particular portion of the outer peripheral surface is greatly distorted, it may result in reductions in a lifetime of the rolling bearing 1D. In view of the point described above, preferably, the outer peripheral surface of the outer ring 10 located directly above a given rolling element 30 is held by the inner peripheral surface of the housing, by contact with inner peripheral surface of the housing, over the whole circumference of the outer ring.

The preload F is applied to the rolling bearing 1D, and thus the rolling elements 30 are distributed toward a direction opposite the direction expressed by the arrow, with respect to a middle portion of the outer ring 10 in a thickness direction of the outer ring. In view of the point described above, under a condition in which the resistors 103a and 103b are disposed on the side of the outer peripheral surface of the outer ring 10 opposite the preload, when undercuts of the housing are respectively provided with respect to only portions of the resistors 103a and 103b, they are sufficient. The outer peripheral surface of the outer ring 10 located directly above the rolling element 30 can be held by the inner peripheral surface of the housing, by contact with the inner peripheral surface of the housing, over the whole circumference of the outer ring.

Instead of providing one or more undercuts on the housing side, a recessed portion at which a given strain gauge is disposed is also considered to be provided in the outer ring 10 or the inner ring 20.

Greatest strain to be detected by the strain gauge 100D is obtained at the outer peripheral surface of the outer ring 10 that is located directly above each rolling element 30, and small strain is obtained on the side of the outer ring 10 opposite the preload, in comparison to a case of strain obtained directly above each rolling element 30. In such a manner, even if a conventional strain gauge is disposed on the side of the outer peripheral surface of the outer ring 10 opposite the preload, it has been difficult to obtain a distorted waveform. In contrast, the strain gauge 100B that uses the Cr composite film as each resistor is highly sensitive and thus can detect small displacement. Therefore, even if the strain gauge 100D is disposed on the side of the outer peripheral surface of the outer ring 10 opposite the preload, a distorted waveform can be accurately obtained.

Even in the manner illustrated in FIG. 11, the outer peripheral surface of the outer ring 10 located directly above a given rolling element 30 can be held by the inner peripheral surface of the housing, by contact with the inner peripheral surface of the housing, over the whole circumference of the outer ring. However, the manner illustrated in each of FIG. 14 and FIG. 15 is advantageous over the manner illustrated in FIG. 11, because attachment of the strain gauge is easily performed in comparison to a case of the attachment to the end surface of the outer ring 10, and further a great distorted waveform is obtained in comparison to the case of the attachment to the end surface of the outer ring 10.

<Second Embodiment>

A second embodiment provides an example of the rolling bearing having the housing outside the outer ring. In the second embodiment, the description for the same components as those that have been described in the embodiment may be omitted.

Figure 16:
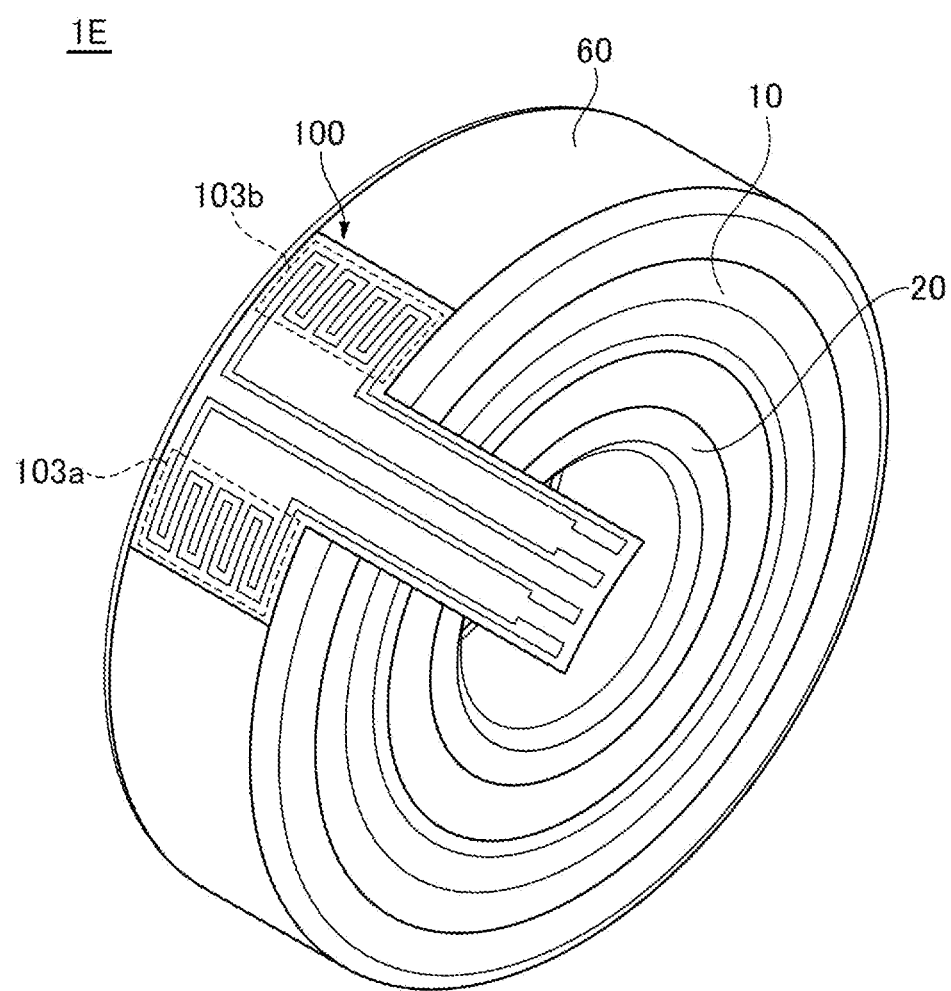
FIG. 16 is a perspective view of an example of the rolling bearing according to a second embodiment.
Figure 17:
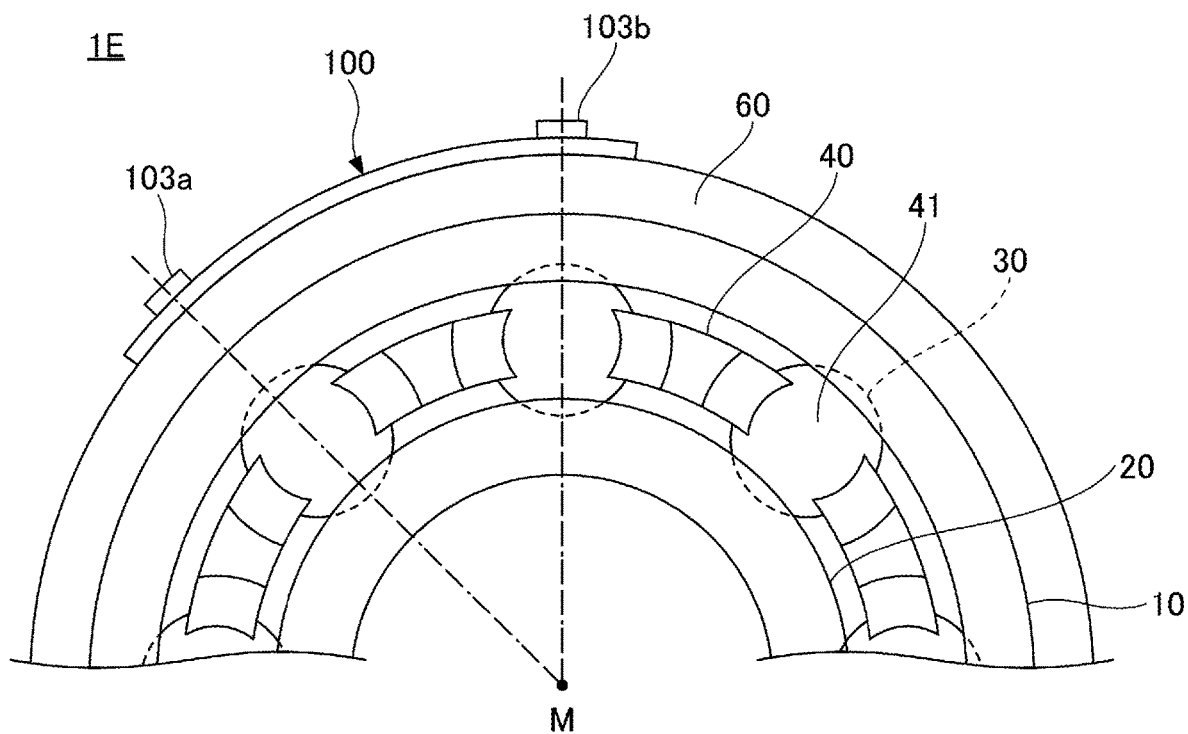
FIG. 17 is a partial front view of an example of the rolling bearing according to the second embodiment.

FIG. 16 is a perspective view of an example of the rolling bearing according to the second embodiment. FIG. 17 is a partial front view of an example of the rolling bearing according to the second embodiment. Referring to FIG. 16 and FIG. 17, a rolling bearing 1E includes a housing 60 disposed on an outer peripheral side of the outer ring 10, and the strain gauge 100 is disposed on the outer peripheral surface of the housing 60. The housing 60 holds the outer peripheral surface of the outer ring 10 over the whole circumference of the outer ring. The housing 60 can be formed of, for example, brass or the like.

For example, the outer ring 10 has a small diameter (e.g., diameter of about 20 mm) and thus it might be difficult to dispose the strain gauge 100 on the outer ring 10. In such a case, as illustrated in the rolling bearing 1E, when the housing 60 is disposed on the outer peripheral side of the outer ring 10, and the strain gauge 100 is disposed on the outer peripheral surface of the housing 60, arrangement is sufficient. Alternatively, the strain gauge 100 may be disposed on a given end surface of the housing 60. With this arrangement, the strain gauge 100 can be easily disposed. The strain of the outer ring 10 is transferred through the housing 60 to the strain gauge 100 and is detectable by the strain gauge 100.

As described above, the strain gauge 100 using the Cr composite film as the material of the resistor 103 is highly sensitive, and can detect small displacement. Thus, minute strain, which was difficult to be detected in the past, can be detected. In other words, with the strain gauge 100 using the Cr composite film as the material of the resistor 103, the rolling bearing 1E having a function for accurately detecting strain can be achieved. As a result, even when the strain gauge 100 is disposed on the housing 60, a bearing monitoring apparatus 200 that can detect a wear state of the rolling bearing 1E can be provided.

The shape of the housing is not limited to an annular shape, and any shape may be adopted. Alternatively, when the rolling bearing 1E is used in a rotating apparatus such as a fan motor, the housing 60 may also serve as a housing for the rotating apparatus. In other words, in a rotating apparatus having a rolling bearing, a given strain gauge may be disposed on an outer peripheral surface or end surface of the housing for the rotating apparatus.

Although the preferred embodiments have been described in detail above, various modifications or substitutions to the embodiments described above can be made without departing from the scope set forth in the claims.

This International Application claims priority to Japanese Patent Application No. 2019-115681, filed Jun. 21, 2019, the contents of which are incorporated herein by reference in their entirety.

REFERENCE SIGNS LIST 1, 1A, 1B, 1C, 1D, 1E rolling bearing, 10 outer ring, 11, 21, 41 recessed portion, 20 inner ring, 30 rolling element, 40 holder, 42 back surface, 51, 52 seal, 60 housing, 70 race, 100, 100A, 100B, 100C, 100D strain gauge, 101 substrate, 101a upper surface, 102 functional layer, 103a, 103b resistor, 104 line, 105a, 105b terminal section, 106 cover layer, 200 bearing monitoring apparatus, 210a, 210b analog front end, 211 bridge circuit, 212 amplifier circuit, 213 A/D converter circuit, 214 interface, 220 arithmetic unit, 2201 subtracting unit, 2202 comparator

The invention claimed is:

1. A bearing monitoring apparatus comprising:
  a rolling bearing including
    an outer ring,
    an inner ring disposed coaxially with the outer ring, the inner ring being on an inner peripheral side of the outer ring,
    multiple rolling elements disposed between the outer ring and the inner ring, and a strain gauge configured to detect strain of the outer ring or the inner ring, the strain gauge including at least two resistors, and the resistors being arranged in a same direction as an arrangement direction of the rolling elements so as to correspond to spacing between rolling elements that are next to each other;

a first circuit configured to generate a first distorted waveform based on an output of one resistor of the at least two resistors and to generate a second distorted waveform based on an output of another resistor of the at least two resistors; and a second circuit configured to:
subtract the second distorted waveform from the first distorted waveform to generate a differential waveform; and
compare the differential waveform against a reference value to detect a wear state of the rolling bearing.

2. The bearing monitoring apparatus according to claim 1, wherein the at least two resistors in the rolling bearing are disposed on an outer peripheral surface of the outer ring or an inner peripheral surface of the inner ring.

3. The bearing monitoring apparatus according to claim 2, wherein the at least two resistors in the rolling bearing are disposed on a side opposite a preload.

4. The bearing monitoring apparatus according to claim 1, wherein the at least two resistors in the rolling bearing are disposed on an end surface of the outer ring or an end surface of the inner ring.

5. The bearing monitoring apparatus according to claim 1, wherein the rolling bearing includes a housing disposed in contact with the outer periphery of the outer ring, and
wherein the at least two resistors are disposed on an outer peripheral surface of the housing.

6. The bearing monitoring apparatus according to claim 1, wherein the rolling bearing includes a housing disposed in contact with the outer periphery of the outer ring, and
wherein the at least two resistors are disposed on an end surface of the housing.

7. The bearing monitoring apparatus according to claim 1, wherein the at least two resistors in the rolling bearing are arranged such that a longitudinal direction of each resistor is directed in a circumferential direction of the outer ring or the inner ring.

8. The bearing monitoring apparatus according to claim 1, wherein each of the at least two resistors in the rolling bearing is formed of a Cr composite film.

9. A method for monitoring a bearing, the method comprising:
generating a first distorted waveform based on an output of one resistor of at least two resistors in a rolling bearing, and generating a second distorted waveform based on an output of another resistor of the at least two resistors, the rolling bearing including
an outer ring;
an inner ring disposed coaxially with the outer ring, the inner ring being on an inner peripheral side of the outer ring,
multiple rolling elements disposed between the outer ring and the inner ring, and
a strain gauge configured to detect strain of the outer ring or the inner ring, the strain gauge including the at least two resistors, and the resistors being arranged in a same direction as an arrangement direction of the rolling elements so as to correspond to spacing between rolling elements that are next to each other;
subtracting the second distorted waveform from the first distorted waveform to generate a differential waveform; and
comparing the differential waveform against a reference value to detect a wear state of the rolling bearing.

* * * * *